May 7, 1946. E. F. CHANDLER 2,399,985
SYSTEM OF HEATING
Filed July 1, 1943
Fig. 1
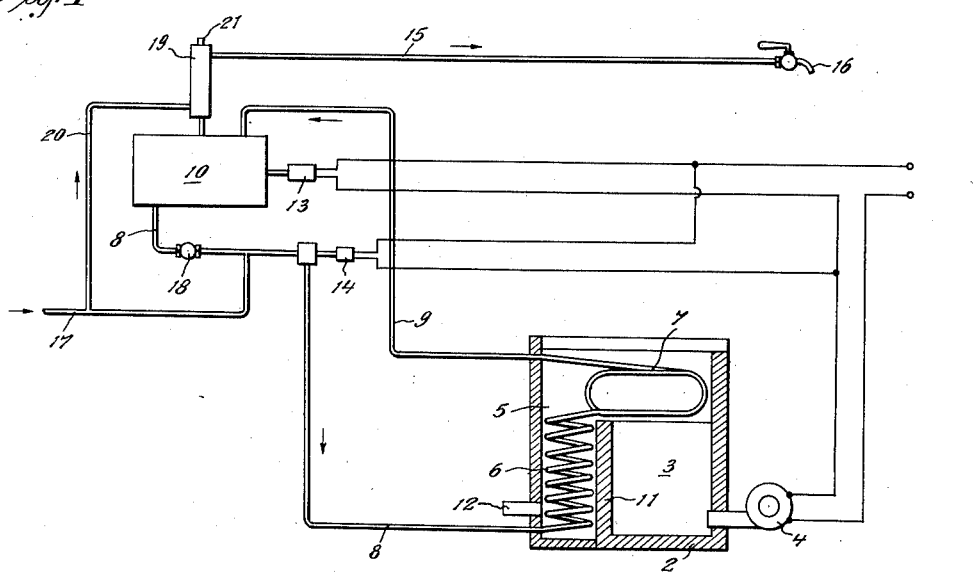
Fig. 3
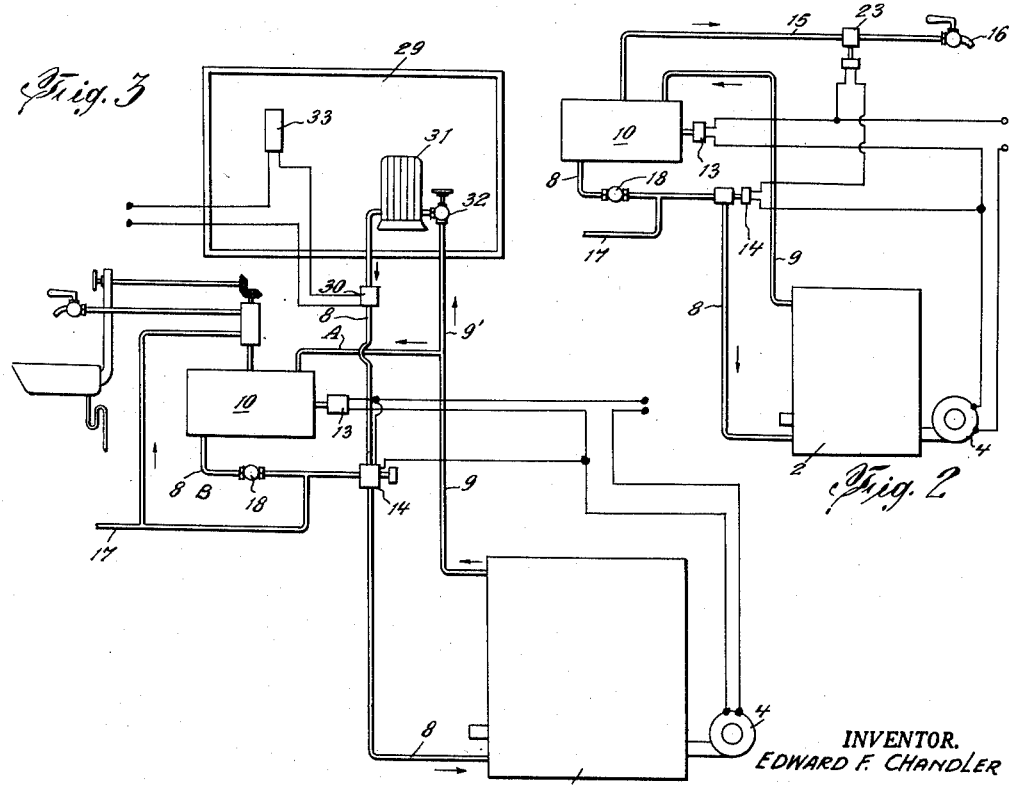
Fig. 2
INVENTOR.
EDWARD F. CHANDLER
BY John P. Chandler
his Attorney Patented May 7, 1946

2,399,985

UNITED STATES PATENT OFFICE 2,399,985

SYSTEM OF HEATING

Edward F. Chandler, Brooklyn, N. Y., assignor to John P. Chandler, as trustee

Application July 1, 1943, Serial No. 493,157

10 Claims. (Cl. 237—8)

This invention relates to fluid heaters, and more particularly to fluid heating systems wherein a quantity of fluid is maintained at substantially a predetermined temperature at all times. The present application constitutes in part a continuation of my co-pending application on a "Heating system," filed December 24, 1940, Serial No. 371,516.

In the usual "storage" hot-fluid heating systems, it is necessary to employ a comparatively large container or tank in order to store a sufficient quantity of the heated fluid to afford an adequate service supply. One of the principal reasons for this is that the heated fluid being drawn from the storage container is replaced by cold make-up fluid; for example, in a water heating system, by water from the city water supply main. Accordingly, as heated fluid is drawn from the tank, the balance of the fluid in the tank is being cooled by the incoming make-up fluid, and therefore, if the volume of stored heated fluid is not comparatively large, the heated fluid being drawn from the tank would soon be cooled to a relatively low temperature. It is then necessary, in order to be able to draw more fluid heated to the required temperature, to wait until substantially all of the fluid in the tank has again been brought to the desired heat by the fluid heating means. The cost of maintaining this relatively large body of fluid at a high temperature at all times is considerable because of radiation and other losses.

The present invention overcomes these and other objections with a simple and commercially practical system employing an improved principle of operation. It is among the desiderata of the invention to provide a fluid heating system wherein a fluid at the temperature desired for use is at all times available, without the necessity of storing a large reserve of heated fluid. Another object of the invention is to provide an automatic system wherein heated fluid drawn from a relatively small reserve of fluid, maintained at all times at substantially a predetermined high temperature, is replenished, substantially as drawn, by heated make-up fluid.

A further object is to provide an efficient, economically-operating and inexpensive fluid-heating system for automatically supplying a heated fluid for direct use, as, for example, to supply domestic or industrial hot water, or for the supplying of a heated fluid to heat-utilizing apparatus, such as convectors, space-heaters, and the like, or for both purposes, alone or in combination. Another object of the invention is to provide a more efficient system of heating a body of fluid and for delivering said fluid at a substantially constant temperature. An important object of the present invention is to provide means for circulating the fluid in the system, without mechanical moving parts.

Other objects and advantages of the invention will in part be obvious, and in part be pointed out hereinafter.

Preferred embodiments of the invention are disclosed in the accompanying drawing, which is schematic and not intended as a working drawing, wherein:

Fig. 1 is a diagrammatic view of a system embodying one form of the invention.

Fig. 2 is a diagrammatic view of a system embodying another form of the invention.

Fig. 3 is a diagrammatic view of a system embodying means for both generating a supply of heated fluid and utilizing the heat thereof.

Referring to Fig. 1, the fluid heating means 2 preferably includes a combustion chamber 3 and a suitable source of heat 4, which may be an oil burner or other heat-evolving means. Within the heating means 2, and preferably situated in the flue chamber 5, is a fluid preheating coil 6 connected at one end with a generating coil 7, and at the other end with the fluid return pipe 8. The outlet end of the generator coil 7 is connected with the heated fluid delivery pipe 9, which is connected with, and delivers fluid to, the storage container 10. When the source of heat, for example, the oil burner 4, is operating, combustion takes place in the chamber 3, thereby highly heating the generator coil 7, the heated products of combustion passing over the wall 11 on their way to the stack outlet 12 giving up their heat to the incoming cool fluid in the preheater coil 6 positioned in their path within the flue chamber 5. By this method of applying the heat from the source 4, it will be noted that the fluid in the tubular system is highly heated in the generator coil 7, and progressively less highly heated in the coil 6, as the fluid nears the inlet thereto to which the return pipe 8 is connected. The direction of heating is contra-flow to the direction of travel of the combustion products, and hence at all points along the path affords a maximum temperature difference between the hot, escaping flue gases and the fluid being heated.

A result of this method of positioning said coils and applying the heat thereto is the conversion into kinetic energy of the intense heat applied within the generator coil 7, and the setting up within the tubular system of rapid uni-directional pulsations, or, what may be termed a "heat-pump" action, by means of which the fluid is caused to flow rapidly in the direction in which the fluid is being progressively heated to a higher temperature. This direction of flow corresponds with that which would be caused by "gravity circulation," but is characterized by a greatly-accelerated rate of fluid travel and a more positive and powerful pump-like action. The heated fluid supplied by the heating means 2, through pipe 9, accumulates in tank 10, said tank being connected preferably at a low point with the pipe 8 for returning fluid from the tank 10 to the heating means 2. A circulating system is thus afforded in which is included the heating means and the storage tank, and in which heated fluid generated in the heating means 2 is delivered to tank 10, and cooler water in the tank 10 is returned to the heater 2. When the system is in full operation, as described, this circulating action is rapid and positive, and the relatively small quantity of fluid in the storage space is quickly brought to the desired predetermined temperature.

To discontinue or modify the generation of heat within the heating means 2, when the heat of the fluid stored in the tank 10 has reached the desired temperature, a suitable thermal-responsive means, such as the aquastat 13, may be employed. Positioned with respect to the tank so as to respond to changes in the temperature of the fluid therein, the aquastat 13 may be electrically or otherwise connected, in a well-known manner, so as to govern the operation of the heat source 4, as, for example, to discontinue or reduce the rate of operation of the same and hence discontinue or modify the supply of heated fluid to the storage space. Assuming that the storage tank 10 is charged with fluid heated to the desired temperature and the heating means, due to the functioning of the aquastat 13, has ceased delivering heated fluid into the system, it will be understood that over a period of time there will be a gradual loss of heat from the system by radiation. Consequently, even if none of the heated fluid stored in the tank 10 is drawn off, the temperature of this stored fluid will gradually decrease.

Accordingly, it is not only desirable but important that this decrease in the temperature of the stored fluid be checked within a relatively narrow heat range, so as to maintain at all times a supply of fluid which has been heated to substantially the predetermined temperature. Usually, the same means, as, for example, aquastat 13, would be depended upon to start the heating means 2, thereby supplying heated fluid to the tank 10 when the heat of the fluid stored therein fell below the desired predetermined, manually-set temperature. However, this may not be found satisfactory because of the relatively great change in temperature required to cause the aquastat, which has been set to function at a maximum temperature, to respond to a desired lower temperature.

To overcome this objection, and to narrow the temperature difference between the so-called "on- and off" positions, a second aquastat 14 may be so positioned with respect to the system as to respond to temperature changes in the fluid being returned from the storage tank 10 to the heating means 2. During idle periods, it will be understood that by the action of "gravity circulation," cooler fluid in the lower part of the tank 10 will flow toward the heating means 2, to displace the warmer fluid, which, in turn, is caused to flow into the storage tank 10 in a relatively slow, but continuous, cycle. Advantage is taken of this fact in the placing of aquastat 14 in the path of this cooler returning fluid, and adjusting the same to respond readily when said fluid becomes cooled to substantially a predetermined "low" temperature.

As the fluid at this point is always relatively cooler than the fluid higher in the system, as in the tank 10, for example, it will be seen that a thermal response may be expected from aquastat 14 much more promptly than from aquastat 13. This aquastat 14 may be electrically or otherwise connected, in a well-known manner, so as to govern the operation of the heat source 4 independently of the other aquastat 13, as, for example, during periods when aquastat 13 is held inoperative to initiate operation of the heat source 4 by the temperature of the fluid in the tank 10. In other words, when a small or moderate quantity of water is withdrawn through faucet 16, there may not be a sufficient drop in the temperature of the highly-heated water in tank 10 to immediately start the burner through closing of the switch in aquastat 13. When, however, a greater quantity of hot water is withdrawn through the faucet, and such quantity is still not large enough to cause a sufficient drop of the temperature in tank 10 to close the switch in aquastat 13, it is nevertheless desired to start the burner due to the passage of a considerable amount of cold supply water through supply pipe 17 passing into pipe 8. When this occurs, the switch in aquastat 14 is closed and the burner commences operation. This provides a sensitive control which assures a supply of hot water at all times without the necessity, however, of starting the burner every time a modest amount of hot water is withdrawn through the faucet. By this means, it will be realized that an important function of aquastat 13 is to govern the degree of heating of the fluid in the tank 10 and preventing the development of temperatures therein substantially above the predetermined, manually-fixed limit. It will be further appreciated that an important function of aquastat 14 is to start promptly making up heat losses from the stored fluid before the temperature thereof has dropped to an undesired low point.

Pipe 15, preferably connected with the upper part of tank 10 and equipped with a suitable cock 16, serves for drawing heated fluid from the storage tank 10 under the pressure of fluid entering the system through the pipe 17 from a suitable source. In a water-heating system, pipe 17 may be connected with the city water supply. Pipe 17 is connected with the system and delivers fluid into pipe 8, preferably at a point relatively near the tank. A suitable check-valve 18 in pipe 8 prevents the incoming fluid from passing into the tank 10, causing the same instead to be delivered to the heater 2, where it enters the preheating coil 6 and the generator coil 7, and then through pipe 9 to the tank 10. However, upon the entrance of the cool fluid from pipe 17 into and through pipe 8, it is passed over the thermal-responsive element of the aquastat 14, thereby influencing the aquastat and placing the heating means 2 in operation.

The operation of the system continues, as already explained, until the heating means 2 is brought to a stop, or the supplying of heat thereby is modified by the functiong of another thermally-responsive element, such as aquastat 13, which may open the circuit and stop operation of the heater when the heat of the fluid stored in tank 10 reaches a predetermined temperature. When the cock 16 is closed and pressure is on the system from the supply main connected to pipe 17, the check-valve permits the cooler fluid to freely flow therethrough toward the heating means 2 by gravity circulation. Where it is desirable to modify the temperature of the hot fluid from the tank 10, a blending valve 19 of any suitable type may be connected with the outlet of tank 10 to the delivery pipe 15, substantially as indicated in the drawing. A branch pipe 20 connects the cool fluid supply with the blending valve in a well-known manner. A suitable adjusting means 21 on the valve 19 affords the means for modifying the temperature of the mixture of cool and heated water to be delivered when the cock 16 is opened.

In Fig. 2, the system illustrated, while generally quite similar to that shown and described hereinbefore, embodies certain modifications, particularly in its mode of operation. In this arrangement, the aquastat 14 is held in a non-operative condition and is incapable of influencing the operation of the heat source 4 of the fluid heater 2 while the cock 16 is closed. A convenient means for accomplishing this is to place in the pipe line 15 a pressure-operated electric switch 23 at a point between the tank 10 and the cock 16. When the cock 16 is opened for the purpose of drawing heated fluid, the pressure in the pipe 15 is relieved, permitting the switch means 23 to close an electric circuit, thereby placing aquastat 14 in condition to respond to a drop in the temperature of the fluid in pipe 8, due to the entrance of cool make-up fluid through pipe 17 which is connected with the source of fluid supply. Accordingly, after aquastat 14 has functioned to start the generation of heated fluid, and as long as the cock 16 remains open, heated fluid will be delivered to the tank 10 by the fluid heating means 2 and discharged from the cock 16.

Upon closing the cock 16, discontinuing the discharge of heated fluid therefrom, the pressure rises in pipe 15, causing the pressure-operated circuit-breaking switch 23 to open, thus rendering aquastat 14 inoperative. The fluid heating means 2 will therefore continue to supply heated fluid to the tank 10, until the predetermined fluid temperature is reached and the operation of the means 2 is stopped or modified by the aquastat 13 associated with tank 10. This embodiment of the invention affords relatively quick starting of the heating means 2, as described, and, by nullifying the effectiveness of aquastat 14 upon stopping the withdrawal of heated fluid, insures the continued supply of heated fluid to tank 10 until the fluid therein has attained its relatively high, predetermined temperature.

It will be understood that the system as described in connection with Fig. 1 may, if desired, be operated with but one aquastat, preferably aquastat 14 situated in the fluid return section. However, in such case, the heating means 2 would continue in operation until the heat of the fluid returning from the tank 10 influenced aquastat 14 to discontinue the same. This, however, is liable to lead to the development of temperatures that are higher than desired in the storage tank 10 for ordinary uses of the system. Accordingly, an advantage of the aquastat 13 as a means for governing the maximum temperature of the fluid in the tank 10 will be evident. It is desired to employ standard equipment of commercial grade, and within this class aquastats, for example, are not as sensitive to close-range adjustments as would be specially built control apparatus which obviously may be used where warranted.

The effect that is desired to be obtained is substantially that of a so-called, instantaneous fluid-heating system, without, however, the objectionable feature in such systems of automatically operating the heat-generating source each time some heated fluid is drawn from the system. The difficulties, mechanical and otherwise, arising from this constant "on-and-off" action of the heat source are entirely eliminated by the present invention, by the employment, among other features, of a relatively small reserve body of heated fluid that is available at all times for instant use, and which is automatically replenished, as its use is continued, substantially without a decrease in the temperature of the fluid being drawn from the system. The heat source 4 is not immediately brought into action upon drawing usual quantities of heated fluid from the system, but only after certain relatively definite changes in the distribution of the heat throughout the system have resulted from the withdrawal of heated fluid, or from radiation losses normally met with in a well-insulated installation.

Fig. 3 illustrates the application of the present invention to a system in which means are employed for utilizing the heated fluid in a system of the kind described for energizing space heating devices, such as convectors, radiators, and the like, or for such other purposes, either alone or in conjunction with heated fluid supplying means, as may be desired. In the drawing, in which similar reference characters are used to designate elements common to the several figures, 29 represents a space to be heated. Situated within said space, or appropriately associated therewith, is a suitable means 31 which may be a convector adapted to directly heat said space, or a radiator over which air is blown to be heated and delivered into said space for the purpose of heating same. Considered as a convector of the usual "hot water" type, an extension 9' of the heated fluid-delivery pipe 9 supplies heated fluid from the heating means 2, through the valve 32 into the convector 31, where it gives up heat and is returned by the extension 8' of the fluid return pipe 8 to the means 2.

Assuming that the storage tank 10 contains fluid heated to the desired temperature, and that no heated fluid is being withdrawn for the moment, it will be understood that as a result of gravity circulation, the convector 31, as well, will contain fluid of substantially similar temperature. Upon the convector 31 dissipating some of the heat of the fluid therein, an initial circulation will start from the tank 10 through that part of pipe 9 marked A, to the pipe extension 9', thence to and through the convector 31, and back to the tank 10 by means of pipe extension 8' and that part of pipe 8 marked B. This reversal of flow direction in a part of the circuit is the direct result of gravity action—the cooler fluid from 31 displacing the warmer and less dense fluid in the tank 10.

Within the space 29 is a suitable thermal-responsive means 33, which may be a thermostat. The purpose of the means 33 is to start the operation of a mechanical circulator 30 in the pipe 8' when the temperature within the space 29 falls to a predetermined minimum. The operation of the circulator 30 establishes a flow of the fluid from the heating means 2, through pipe 9 and the extension 9' thereof to the convector 31, and from the convector through pipe extension 8' and pipe 8 back to the unit 2. When the cooler fluid returning to the heating means 2 drops to a certain low temperature, the aquastat 14 in the return pipe 8 responds thereto to start the operation of the heat source 4 to compensate for the heat dissipated by the radiating means 31. When the heat released by the convector 31 has reestablished the temperature desired to be maintained within the space 29, the thermostat discontinues the operation of the circulator 30, and as the fluid in the return pipe 8 is now at an elevated temperature, aquastat 14 functions to discontinue the operation of the heat source 2.

The supply of fluid under pressure enters the system directly through pipe 17 or through a suitable pressure-reducing valve (not shown) in the pipe 17, where the pressure of the fluid supply is higher than desired. When the space-heating phase of the cycle is in full operation, as above described, the temporary reversal of flow direction in a part of the system due to gravity circulation is overcome by the uni-directional pump action of the circulator 30 and the heat-pump action of the fluid-heating means. Accordingly, during this period, and if no heated fluid is being withdrawn from the tank 10, there is substantially no flow action in the section of pipe 9 marked A, or in the section of pipe 8 marked B, except as may be caused by slight gravity-circulation action or from other unimportant causes.

What I claim is:

1. A hot water heating system comprising a heating element including means for preheating and means for intensely heating a relatively small quantity of water, a hot water storage tank, means for causing a body of water to circulate between the heating element and the tank by thermal-syphon action comprising a hot water delivery pipe and a return pipe, a source of cold water supply connected with the return pipe, and a flow control valve between the source and the tank to prevent cold water entering the tank when make-up water is supplied, a hot water service pipe connected with the tank, a plurality of heating element control means comprising heat-responsive elements to independently start operation of the heating element, one of such means being associated with the tank, and the other means being positioned in the return pipe between the supply pipe and the heating element.

2. A hot water heating system comprising a heating element including means for preheating and means for intensely heating a relatively small quantity of water, a hot water storage tank of relatively small capacity, means for causing a body of water to circulate between the heating element and the tank by thermal-syphon action, comprising a hot water delivery pipe and a return pipe, a source of cold water supply connected with the return pipe and a check valve between the supply and the tank to prevent cold water entering the tank when make-up water is supplied, a hot water service pipe connected with the storage tank, a hot and cold water blending valve between the service pipe and the tank, a pipe connecting the cold water supply line with the blending valve, a plurality of heating element control means comprising heat-responsive elements to independently start operation of the heating element, one of such means extending into the tank adjacent to the center thereof, and the other means being positioned in the return pipe between the supply pipe and the heating element.

3. A hot water heating system comprising a heating element including means for preheating and means for intensely heating a relatively small portion of the water in the system, a hot water storage tank of relatively small capacity, means for causing the body of water to circulate between the heating element and the tank by thermal-syphon action, comprising a pipe for delivering the intensely heated water to the tank and a return pipe, a source of cold water supply connected with the return pipe and a check valve between the supply and the tank to prevent cold water entering the tank when make-up water is supplied, a hot water service pipe connected with the storage tank, a hot and cold water blending valve between the service pipe and the tank, a pipe connecting the cold water supply line with the blending valve, heating element control means comprising a heat-responsive element associated with the tank for controlling operation of the heating element to keep the water in the tank substantially at a predetermined temperature, another such means being positioned in the return pipe between the supply pipe and the heating element for controlling operation of the heating element when cold make-up water is being supplied to the system, and pressure-responsive means in the system controlling operation of the latter heating element control means, such means being responsive to the pressure of the fluid in the system.

4. A fluid heating system comprising, in combination, means for preheating a fluid, means for generating a heated fluid, a heated fluid storage tank, a gravity circulating fluid circuit including pipe means for conveying heated fluid from the generator to the tank and for returning cooler fluid from the tank to the preheater, a valved outlet connected with the tank for controlling the withdrawal of heated fluid therefrom, a source of unheated fluid for delivery under pressure to the system for replacing the heated fluid discharge from the tank, said unheated fluid being delivered into the pipe means which returns fluid from the tank to the preheater, a check-valve in said pipe means for preventing said cool fluid from directly entering the storage tank and for causing the same to enter the preheater, and thermal-responsive means so positioned in the system as to be affected by the introduction of said unheated fluid for energizing said generator, thereby heating the entering fluid before the same is delivered to the storage tank.

5. A fluid heating system comprising, in combination, means for preheating a fluid, means for generating a heated fluid, a heated fluid storage tank, a gravity circulating fluid circuit including pipe means for conveying heated fluid from the generator to the tank and for returning cooler fluid from the tank to the preheater, a valved outlet connected with the tank for controlling the withdrawal of heated fluid therefrom, a source of unheated fluid for delivery under pressure to the system for replacing the heated fluid discharged from the tank, said unheated fluid being delivered into the pipe means which return fluid from the tank to the preheater, a check-valve in said pipe means for preventing said cool fluid from directly entering the storage tank and for causing the same to enter the preheater, thermal-responsive means affected by the introduction of said unheated fluid for energizing said generator, thereby heating the entering fluid before the same in delivered to the storage tank, and a second thermal-responsive means affected by the heated fluid in the storage tank for energizing said generator when the temperature of fluid in the tank drops below a predetermined temperature, and for discontinuing the energization of said generator when the temperature of the fluid in said tank reaches a substantially predetermined degree.

6. In a fluid heating system, a hot fluid generator comprising means for preheating a fluid and means for generating a heated fluid, a heated fluid storage tank, a gravity circulating fluid circuit including pipe means for conveying heated fluid from the generator to the tank and for returning cooler fluid from the tank to the preheater, a valved outlet connected with the tank for controlling the withdrawal of heated fluid therefrom, a source of unheated fluid for delivery under pressure to the system for replacing the heated fluid discharged from the tank, said unheated fluid being delivered into the pipe means which return fluid from the tank to the preheater, a check-valve in said pipe means for preventing said cool fluid from directly entering the storage tank and for causing the same to enter the preheater, thermal-responsive means affected by the introduction of said unheated fluid for energizing said generator, thereby heating the entering fluid before the same is delivered to the storage tank, and means responsive to a drop in the pressure of the fluid in said valved outlet due to the withdrawal of heated fluid from the storage tank for placing said thermal-responsive means in condition to be affected by the introduction of said unheated fluid into said return pipe.

7. In a fluid heating system, a hot fluid generator comprising means for preheating a fluid and means for generating a heated fluid, a heated fluid storage tank, a gravity circulating fluid circuit including pipe means for conveying heated fluid from the generator to the tank and for returning cooler fluid from the tank to the preheater, a valved outlet connected with the tank for controlling the withdrawal of heated fluid therefrom, a source of unheated fluid for delivery under pressure to the system for replacing the heated fluid discharged from the tank, said unheated fluid being delivered into the pipe means which return fluid from the tank to the preheater, a check-valve in said pipe means for preventing said cool fluid from directly entering the storage tank and for causing the same to enter the preheater, thermal-responsive means affected by the introduction of said unheated fluid for energizing said generator, thereby causing the entering fluid to be heated before the same is delivered to the storage tank, a space-heating element included in the gravity circulating fluid circuit which receives heated fluid from said generator and which returns cooler fluid to said preheater, and a thermal-responsive unit positioned within the space heated by said element, said unit being adapted to energize said generator when the heat within said space falls below a predetermined temperature.

8. In a fluid heating system, the combination of a hot fluid generator comprising means for preheating a fluid and means for generating a heated fluid, a heated fluid storage tank, a gravity circulating fluid circuit including pipe means for conveying heated fluid from the generator to the tank and for returning cooler fluid from the tank to the preheater, a valved outlet connected with the tank for controlling the withdrawal of heated fluid therefrom, a source of unheated fluid for delivery under pressure to the system for replacing the heated fluid discharged from the tank, said unheated fluid being delivered into the pipe means which return fluid from the tank to the preheater, a check-valve in said pipe means for preventing said cool fluid from directly entering the storage tank and for causing the same to enter the preheater, thermal-responsive means affected by the introduction of said unheated fluid for energizing said generator, thereby heating the entering fluid before the same is delivered to the storage tank, a space-heating element included in the gravity circulating fluid circuit which receives heated fluid from said generator and which returns cooler fluid to said preheater, a thermal-responsive unit positioned within the space heated by said element, and mechanical circulating means also in said circuit for increasing the flow of fluid therein, said mechanical circulating means being actuated by said unit to increase said rate of flow when the heat within said space falls below a predetermined temperature.

9. In a fluid heating system, the combination of a hot fluid generator, means for preheating a fluid, a heat-releasing element, a heated fluid storage tank, a gravity circulating fluid circuit including pipe means for conveying heated fluid from the generator to said element and tank, and for returning cooler fluid from said element and tank to the preheater, mechanical circulating means for accelerating the rate of flow of said gravity circulated fluid, a valved outlet connected with the tank for controlling the withdrawal of heated fluid therefrom, a source of unheated fluid for delivery under pressure to the system for replacing heated fluid discharged from the tank, means responsive to heat released by said heat-releasing element governing the operation of said mechanical circulating means, and means thermally responsive to the temperature of the fluid circulated by the mechanical circulating means for energizing said generator to supply heated fluid to said element.

10. In a fluid heating system, a hot fluid generator including means for preheating a fluid, a heat-releasing element, a heated fluid storage tank, a fluid-circulating circuit including a delivery pipe, means for conveying heated fluid from the generator to said element and tank, and a return pipe for conveying cooler fluid from said element and tank to the preheater, means for supplying cool make-up fluid to the system connected with said return pipe, a check valve in said return pipe for preventing unheated make-up fluid from being delivered to said tank, and a thermal-responsive unit in said return pipe governing the operation of said generator, whereby operation of the generator is initiated to produce heated fluid when the temperature of the make-up fluid or of the returning fluid drops below a predetermined temperature.

EDWARD F. CHANDLER.